United States Patent
Haeusler et al.

(10) Patent No.: US 11,145,927 B2
(45) Date of Patent: Oct. 12, 2021

(54) ACCUMULATOR ASSEMBLY FOR AN ELECTRIC HYBRID VEHICLE

(71) Applicant: Mahle International GmbH, Stuttgart (DE)

(72) Inventors: Ingo Haeusler, Esslingen (DE); Ruediger Knauss, Kernen I.r. (DE); Peter Nowak, Stuttgart (DE); Karl-Ulrich Schmid-Walderich, Tuebingen (DE)

(73) Assignee: Mahle International GmbH

( * ) Notice: Subject to any disclaimer, the term of this patent is extended or adjusted under 35 U.S.C. 154(b) by 437 days.

(21) Appl. No.: 16/122,642

(22) Filed: Sep. 5, 2018

(65) Prior Publication Data

US 2019/0074497 A1 Mar. 7, 2019

(30) Foreign Application Priority Data

Sep. 5, 2017 (DE) .......................... 102017215607.4

(51) Int. Cl.
| | |
|---|---|
| *B60K 1/04* | (2019.01) |
| *B62D 25/20* | (2006.01) |
| *H01M 10/613* | (2014.01) |
| *H01M 10/625* | (2014.01) |
| *H01M 2/10* | (2006.01) |
| *H01M 50/20* | (2021.01) |
| *B60L 58/26* | (2019.01) |

(Continued)

(52) U.S. Cl.
CPC ............ *H01M 50/20* (2021.01); *B60K 1/04* (2013.01); *B60L 50/66* (2019.02); *B60L 58/26* (2019.02); *B62D 25/20* (2013.01); *H01M 10/613* (2015.04); *H01M 10/625* (2015.04); *B60K 11/02* (2013.01); *B60K 2001/005* (2013.01); *B60K 2001/0438* (2013.01); *B60Y 2200/90* (2013.01); *B60Y 2306/01* (2013.01); *H01M 50/24* (2021.01); *H01M 2220/20* (2013.01)

(58) Field of Classification Search
None
See application file for complete search history.

(56) References Cited

U.S. PATENT DOCUMENTS

| | | |
|---|---|---|
| 7,688,582 B2 | 3/2010 | Fukazu et al. |
| 2009/0058355 A1 | 3/2009 | Meyer |
| 2017/0149035 A1 | 5/2017 | Sham |

FOREIGN PATENT DOCUMENTS

| | | |
|---|---|---|
| DE | 10 2009 053 979 A1 | 6/2010 |
| DE | 10 2015 015 744 A1 | 6/2017 |

(Continued)

OTHER PUBLICATIONS

DE102016115647B3—machine translation (Year: 2016).*

(Continued)

*Primary Examiner* — Haroon S. Sheikh
(74) *Attorney, Agent, or Firm* — Fishman Stewart PLLC (57) ABSTRACT

An accumulator assembly for an electric or hybrid vehicle may include a housing including a housing upper part and a housing lower part releasably fixed to the housing upper part. The housing upper part may be fixable to a floor panel of the vehicle. The assembly may further include at least one battery module disposed in a receptacle space between the housing upper part and the housing lower part. The at least one battery module may be releasably fixed to the housing upper part.

20 Claims, 4 Drawing Sheets

(51) Int. Cl.
　　B60L 50/60　　(2019.01)
　　*B60K 11/02*　　(2006.01)
　　*B60K 1/00*　　(2006.01)
　　*H01M 50/24*　　(2021.01)

(56) References Cited

FOREIGN PATENT DOCUMENTS

| DE | 102016115647 B3 | 12/2017 |
|---|---|---|
| EP | 2 468 609 A2 | 6/2012 |

OTHER PUBLICATIONS

English abstract of DE-102016115647.
English abstract for DE-10 2009 053 979.
English abstract for DE-10 2015 015 744.

\* cited by examiner

ACCUMULATOR ASSEMBLY FOR AN ELECTRIC HYBRID VEHICLE

CROSS-REFERENCE TO RELATED APPLICATIONS

This application claims priority to German Patent Application No. DE 10 2017 215 607.4, filed on Sep. 5, 2017, the contents of which are hereby incorporated by reference in its entirety.

TECHNICAL FIELD

The invention relates to an accumulator assembly for an electric or hybrid vehicle. The invention furthermore relates to an electric or hybrid vehicle having the accumulator assembly.

BACKGROUND

Accumulator assemblies for electric or hybrid vehicles are already known from the prior art. An accumulator assembly usually comprises a plurality of battery modules in which a plurality of individual cells are electrically interconnected in parallel or in series. The battery modules are disposed in a housing, and the housing is usually fixed to a floor panel below the vehicle. For example, EP 2 468 609 B1 thus describes an accumulator assembly having a plurality of battery modules in one housing. The battery modules herein are fixed to a support plate, and the support plate is fixed to a lid that is fixed to the floor panel of the vehicle. The housing herein is conceived both for receiving the battery modules as well as for reinforcing the floor panel, in a manner similar to that proposed in DE 10 2009 053 979 A1. A similar accumulator assembly is described in DE 10 2015 015 744 A1. The battery modules here are disposed in a tub-shaped lower part, and the lower part is fixed to a lid that is fixed to the floor panel of the vehicle.

In the event of a failure of the battery module, the accumulator assembly conjointly with a plurality of battery modules has to be completely uninstalled and the respective battery module has to be replaced in a maintenance event. The accumulator assembly subsequently has to be fixed to the vehicle again. The individual battery modules and the accumulator assembly have a very large dead weight such that the maintenance work on the accumulator assembly is very complex.

SUMMARY

It is therefore the object of the invention to specify an improved or at least alternative embodiment for the accumulator assembly of the generic type, in which the maintenance work on the accumulator assembly is simplified.

This object is achieved according to the invention by the subject matter of the independent claim(s). Advantageous embodiments are the subject matter of the dependent claim(s).

The present invention is based on the general concept of fixing a battery module in an accumulator assembly for an electric or hybrid vehicle so as to be readily accessible and uninstallable. The accumulator assembly herein has a housing having a housing upper part and having a housing lower part that is releasably fixed to the housing upper part, wherein the housing upper part is fixable to a floor panel of the electric or hybrid vehicle. At least one battery module herein is disposed in a receptacle space between the housing upper part and the housing lower part. According to the invention, the at least one battery module is releasably fixed to the housing upper part. Moreover, the housing upper part can be fixed to the floor panel of the electric or hybrid vehicle. In the event of maintenance, the housing lower part can first be released from the housing upper part for example. The at least one battery module can be releasably fixed in a force-fitting or form-fitting manner to the housing upper part, such that the at least one battery module after the release of the housing lower part can remain fixed to the housing upper part and can now be released from the latter. Should a plurality of battery modules be fixed in the accumulator assembly, said battery modules can be individually released from the housing upper part, and the accumulator assembly can thus be serviced in this way with minimized force and complexity.

In the case of a refinement of the accumulator assembly according to the invention it is advantageously provided that the housing upper part and/or the housing lower part at least in regions are/is composed of a metal, preferably of aluminium or steel, and/or of a fibre-reinforced plastics material. In this way the housing upper part and the housing lower part can better protect the at least one battery module lying therein against mechanical damage. Furthermore, the dead weight of the housing can be advantageously reduced on account of the fibre-reinforced plastics material.

It is advantageously provided that the housing upper part and the housing lower part are designed so as to be tub-shaped. Alternatively, the housing upper part can be designed so as to be tub-shaped, and the housing lower part can be designed so as to be plate-shaped. The housing upper part and/or the housing lower part can moreover have an integrally configured reinforcement structure. The reinforcement structure can have a plurality of integrally configured ribs, for example, by way of which the housing upper part and the housing lower part can be stiffened. In the event of an accident, the vehicle structure of the electric or hybrid vehicle can be supported by the reinforced housing and the impact energy can at least in part be absorbed in the housing. Fastening assemblies for releasably fixing the at least one battery module can advantageously also be disposed in the housing upper part. The reinforced housing lower part can advantageously form an underride protection for the at least one battery module.

In the case of a refinement of the solution according to the invention it is advantageously provided that the housing upper part is fixed in a force-fitting or form-fitting manner to the floor panel and/or to at least one vehicle support of the electric or hybrid vehicle. The housing upper part can thus be screw-fitted or interference-fitted to the floor panel and to the vehicle support, for example, and the rigidity of the electric or hybrid vehicle can be advantageously increased on account thereof.

Alternatively or additionally, the housing upper part can be fixed in a materially-integral manner to the floor panel and/or to at least one vehicle support of the electric or hybrid vehicle, preferably by way of an adhesive connection. On account of the adhesive connection, the housing upper part and the floor panel as well as the vehicle support can be mutually fixed across a large area, on account of which the electric or hybrid vehicle can be additionally reinforced. In the event of an accident, the impact energy can also be received and absorbed in the housing upper part. Tolerances between the floor panel and the housing upper part can also advantageously be equalized by the adhesive connection. In order for the adhesive connection to be protected against moisture it is furthermore provided that the adhesive connection in relation to the outside is protected by means of a water-tight seal structure.

It is advantageously provided that the housing upper part at least in regions forms the floor panel of the electric or hybrid vehicle. For example, the housing upper part can thus be fixed to the vehicle supports and the housing upper part can replace the floor panel of the electric or hybrid vehicle. In this way, the cost of materials and the dead weight of the electric or hybrid vehicle can be reduced. Alternatively or additionally, the housing lower part can form an underride protection for the at least one battery module.

In the case of an advantageous refinement of the accumulator assembly it is provided that the at least one battery module is releasably fixed to the housing upper part by way of a self-closing and self-opening connection, preferably by way of a snap-fit connection. The at least one battery module herein is fixable to the housing upper part by way of a movement in the direction of the latter. In this advantageous way the at least one battery module can be released from the housing upper part in a simplified manner or be fixed to the housing upper part in a simplified manner. In the event of maintenance, the housing lower part can be released from the housing upper part, for example, and the at least one battery module can be released from the housing upper part by way of a movement away from the housing upper part. Should a plurality of battery modules be fixed in the accumulator assembly, the latter can thus be individually released from the housing upper part, and the accumulator assembly can be serviced in this way with minimized force and complexity.

It can advantageously be provided that the accumulator assembly has a plurality of battery modules and the housing lower part is formed from a plurality of lids. The respective lid herein is assigned to the respective battery module such that a number of lids corresponds to a number of battery modules in the accumulator assembly. The respective battery module is moreover fixed in a form-fitting manner and/or in a force-fitting manner and/or in a material-bonded manner to the respective lid. The respective battery module is releasably fixed to the housing upper part such that in the event of maintenance the respective battery module conjointly with the lid can be released from the housing upper part by way of a movement away from the housing upper part. Accordingly, the respective battery module conjointly with the lid can be fixed to the housing upper part by way of a movement towards the housing upper part. The plurality of battery modules in the accumulator assembly can be individually released from the housing upper part, and the accumulator assembly can in this way be serviced with minimized force and complexity.

In an advantageous refinement of the accumulator assembly it is provided that the accumulator assembly has a cooling device that is capable of being perfused by a coolant fluid, having a coolant fluid distribution, and at least one cooling plate provided for the respective battery module, said cooling plate being capable of being surrounded by a flow of the coolant. The coolant distribution of the cooling device herein is fixed to the housing upper part, and the respective cooling plates are fixed to the respective battery modules so as to face the housing lower part and so as to transfer heat. The receptacle space of the housing is capable of being perfused by the coolant fluid, and the respective battery module can be cooled in a particularly effective manner. The respective cooling plate herein is fixed to the respective battery module so as to transfer heat, and can have, for example, projecting heat dissipaters which engage between the individual battery cells of the respective battery module. In this advantageous way, the heat from the individual battery cells of the respective battery module can be dissipated by way of the heat dissipaters to the respective cooling plate and from the respective cooling plate to the coolant fluid.

In the case of an advantageous refinement of the accumulator assembly it is provided that the accumulator assembly has an electrical switching unit that is fixed to the housing upper part. Electrical terminals of the at least one battery module in this instance are directed towards the housing upper part and can be electrically switched to the switching unit by way of a movement of the battery module in the direction of the housing upper part. The assembly operation of the accumulator assembly can be significantly simplified in this advantageous way.

Overall, the battery modules in the accumulator assembly according to the invention can be individually replaced, and the accumulator assembly according to the invention, on account thereof, can be serviced with reduced complexity. In the case of advantageous further design embodiments of the accumulator assembly the respective battery module can be electrically linked to the switching unit, and moreover the battery module can be fixed to the housing upper part, by a movement in the direction of the housing upper part. On account thereof, both the assembly operation as well as the maintenance of the accumulator assembly can be significantly simplified.

The invention also relates to an electric or hybrid vehicle having an accumulator assembly. The accumulator assembly herein has a housing having a housing upper part and having a housing lower part. The accumulator assembly according to the invention is designed as has been described above. The housing upper part can advantageously be fixed in a force-fitting or form-fitting manner to a floor panel and/or to at least one vehicle support of the electric or hybrid vehicle. Alternatively or additionally, the housing upper part can be fixed in a material-bonded manner to the floor panel and/or to at least one vehicle support of the electric or hybrid vehicle, preferably by way of an adhesive connection. It can furthermore be provided that the housing upper part at least in portions forms the floor panel of the electric or hybrid vehicle.

Further important features and advantages of the invention are derived from the dependent claims, from the drawings, and from the associated description of the figures by means of the drawings.

It is to be understood that the features mentioned above and yet to be explained hereunder can be used not only in the combination set forth in each case but also in other combinations or as stand-alone features, without departing from the scope of the present invention.

Preferred exemplary embodiments of the invention are illustrated in the drawings and will be explained in more detail in the description hereunder, wherein the same reference signs refer to identical or similar or functionally equivalent components.

BRIEF DESCRIPTION OF THE DRAWINGS

In the figures, in each case in a schematic manner.

DETAILED DESCRIPTION

Figure 1:
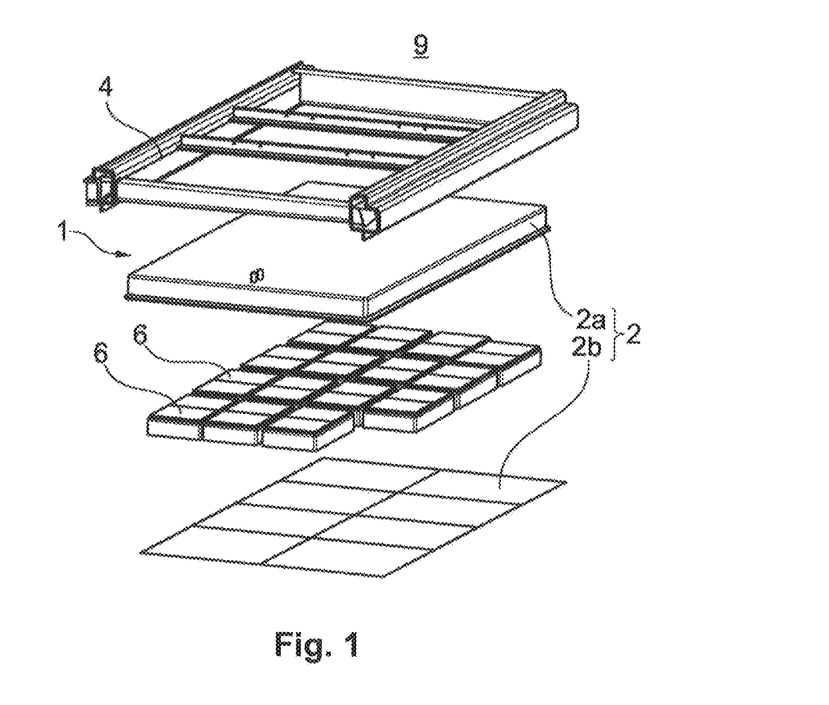
FIG. 1 shows an exploded view from above of an accumulator assembly according to the invention.
Figure 2:
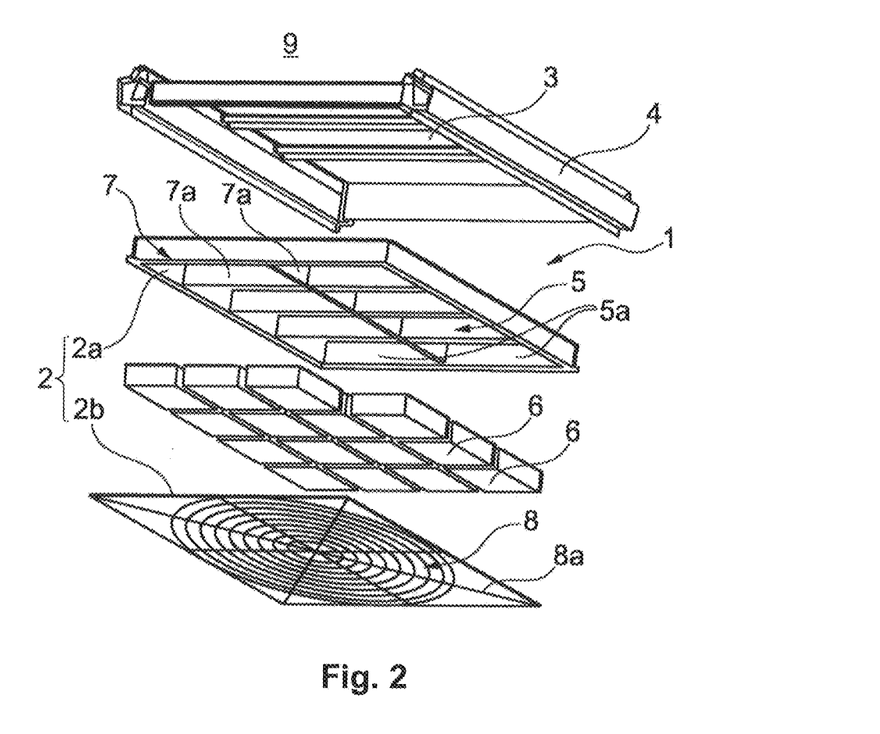
FIG. 2 shows an exploded view from below of the accumulator assembly shown in FIG. 1.

FIG. 1 shows an exploded view from above of an accumulator assembly 1 according to the invention for an electric or hybrid vehicle 9. An exploded view of the accumulator assembly 1 from below is shown in FIG. 2. The accumulator assembly 1 has a housing 2 having a tub-shaped housing upper part 2a and a plate-shaped housing lower part 2b which is releasably fixable, for example in a force-fitting or form-fitting manner, to the housing upper part 2a. The housing upper part 2a is fixable to a floor panel 3 and/or to vehicle supports 4 of the electric or hybrid vehicle 9. Fixing of the housing upper part 2a to the floor panel 3 and to the vehicle supports 4 herein can be performed in a force-fitting or in a form-fitting manner, or else in a material-bonded manner by way of a welded or adhesive connection.

A plurality of battery modules 6 are disposed in the receptacle space 5 between the housing upper part 2a and the housing lower part 2b, said battery modules 6 being releasably fixed to the housing upper part 2a. Releasable fixing of the battery modules 6 to the housing upper part 2a herein can be performed in a force-fitting or form-fitting manner. In the event of maintenance, the housing lower part 2b can be released from the housing upper part 2a, and the individual battery modules 6 in the housing upper part 2a can be exposed. The battery modules 6 subsequently can be individually released from the housing upper part 2a and replaced. The housing upper part 2a herein can remain fixed to the floor panel 3 and to the vehicle supports 4, and the accumulator assembly 1 can in this way be serviced with reduced complexity and in a simplified manner.

The housing upper part 2a has an integrally configured reinforcement structure 7, and the housing lower part 2b has an integrally configured reinforcement structure 8. The respective reinforcement structures 7 and 8 have in each case a plurality of integrally configured ribs 7a and 8a by way of which the housing upper part 2a and the housing lower part 2b are stiffened. The ribs 7a in the housing upper part 2a subdivide the receptacle space 5 into individual spaces 5a, wherein in each case one battery module 6 is fixable in each of the individual spaces 5a. The housing upper part 2a and the housing lower part 2b can be composed of a metal, for example of aluminium or steel, or of a fibre-reinforced plastics material. The rigidity of the housing 2 can be increased on account thereof. Furthermore, in the event of an accident, the floor panel 3 and the vehicle support 4 can be supported by the housing 2, and the impact energy can at least partially be absorbed in the housing 2.

Figure 3:
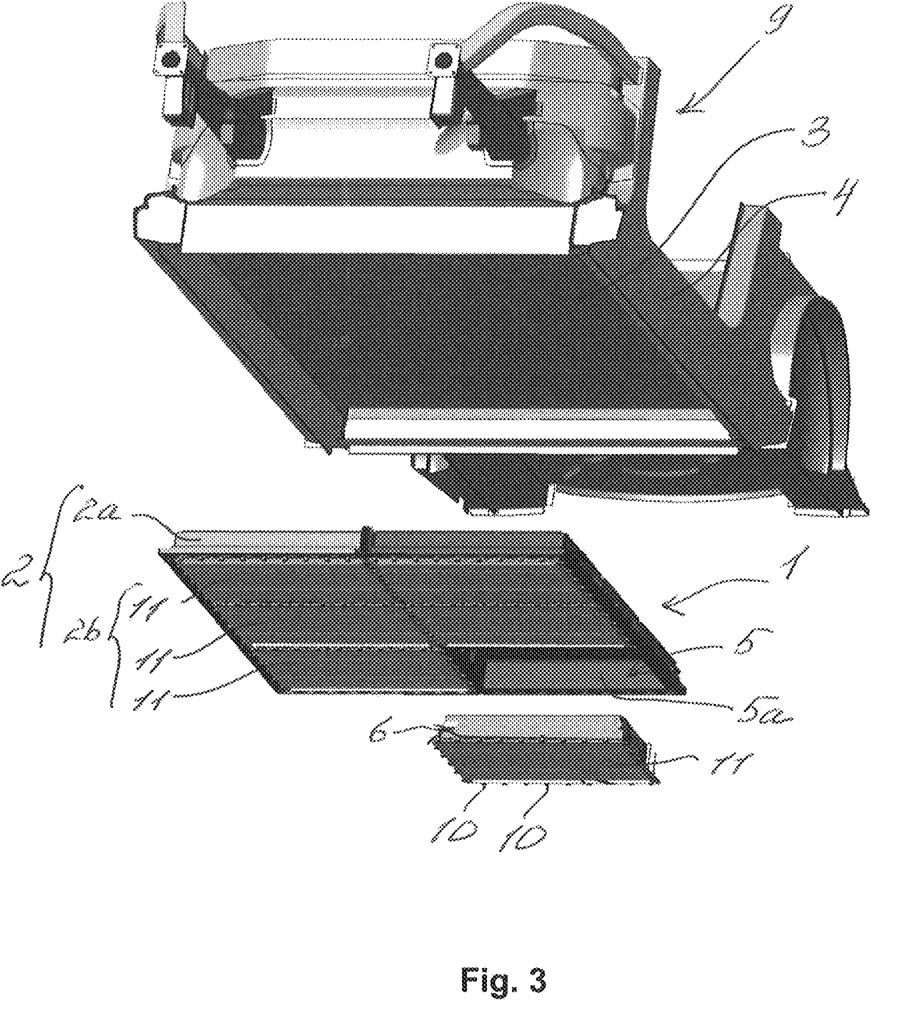
FIG. 3 shows an exploded view from below of an accumulator assembly according to the invention in an alternative design embodiment.

FIG. 3 shows the accumulator assembly 1 having the housing lower part 2b in an alternative design embodiment. The housing lower part 2b here is formed from a plurality of lids 11, wherein the respective lid 11 is assigned to the respective battery module 6. The accumulator assembly 1 thus has an identical number of lids 11 and of battery modules 6. The respective battery module 6 herein is fixed in a form-fitting manner to the respective lid 11 by way of a plurality of screws 10, wherein the respective battery module 6 conjointly with the respective lid 11 is fixable to the housing upper part 2a by way of a movement in the direction of the latter. To this end, in each case one snap-fit unit that is complementary to the respective other snap-fit unit of a self-acting latching snap-fit connection can be fixed to the respective battery module 6 and housing upper part 2a.

Figure 4:
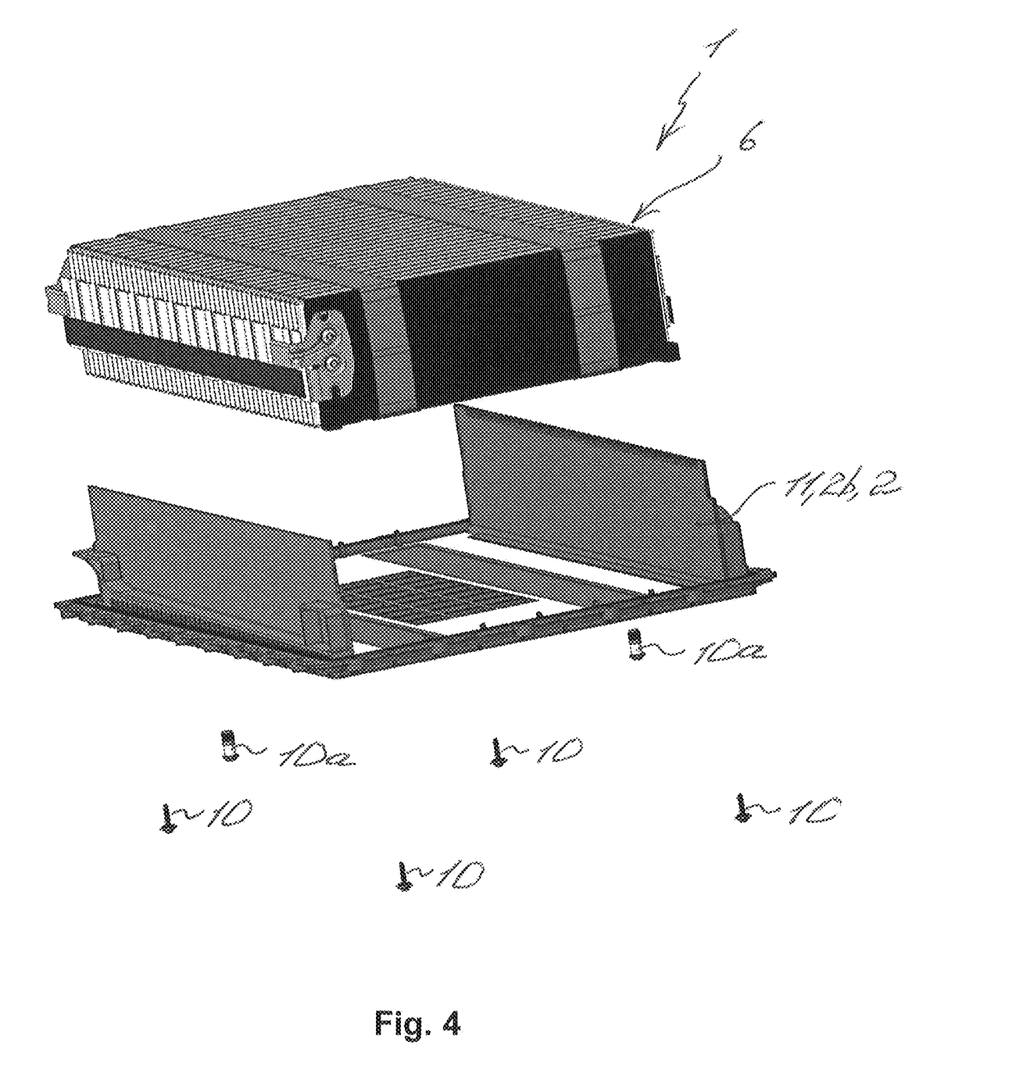
FIG. 4 shows an exploded view of a battery module on the lid in an accumulator assembly according to the invention.
Figure 5:
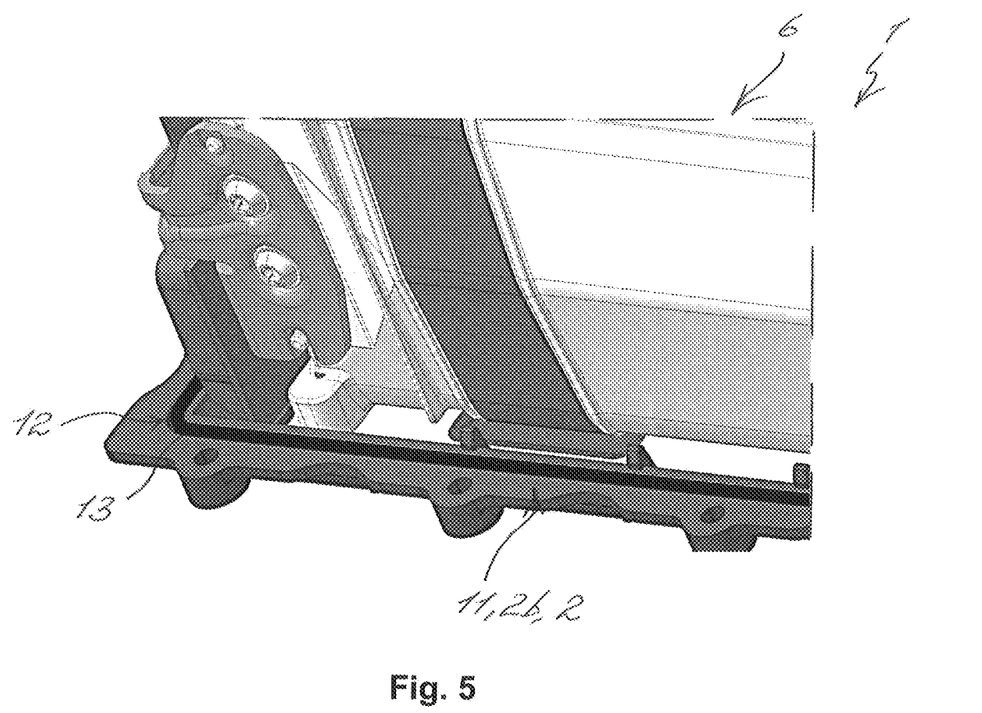
FIG. 5 shows a partial view of the battery module and of the lid from FIG. 4.
Figure 6:
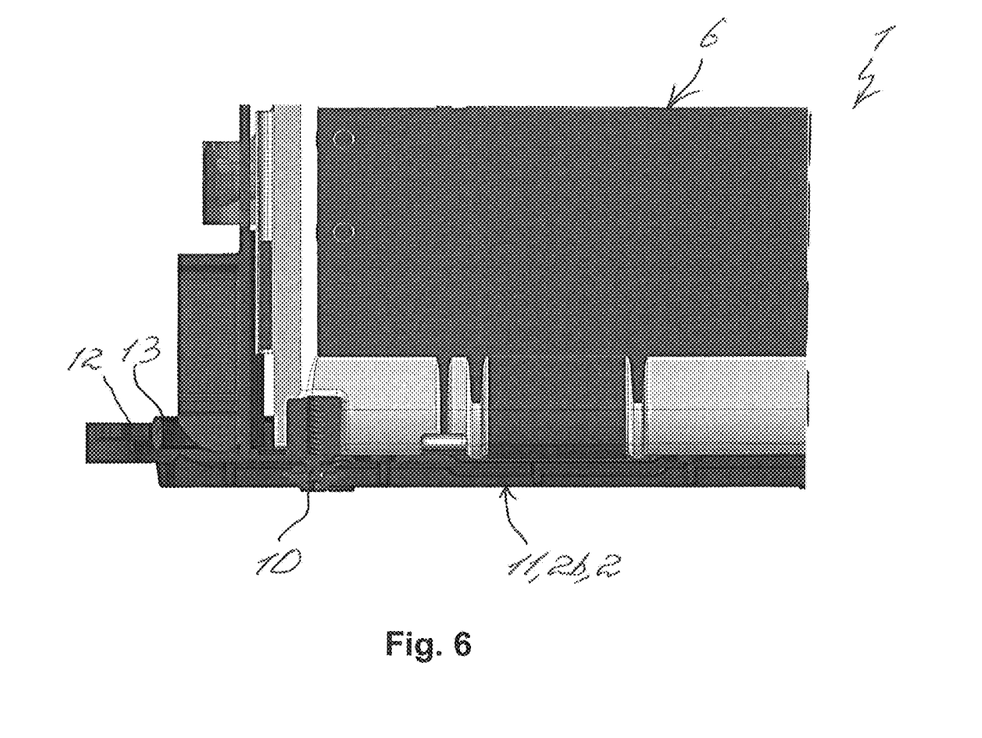
FIG. 6 shows a sectional view of the battery module and of the lid from FIG. 4.

FIG. 4 shows an exploded view of the battery module 6 on the lid 11. The screws 10 by way of which the battery module 6 is fixed in a force-fitting manner to the lid 11 are visible here. The lid 11 conjointly with the battery module 6 is fixed to the housing upper part 2a by way of screws 10a. FIG. 5 shows an enlarged partial view of the battery module 6 and of the lid 11 from FIG. 4. Furthermore, an encircling sealing groove 12 in which a seal 13 is incorporated is configured on the respective lid 11. The seal 13 in the sealing groove 12 seals the lid 11 in relation to the housing upper part 2a such that the receptacle space 5 of the housing 2 is sealed in relation to the outside. On account thereof, the receptacle space 5 of the housing 2, and thus the battery modules 6, can be protected against dirt. Should the battery modules 6 be cooled by a coolant that flows so as to directly surround said battery modules 6, the coolant can thus also not leak from the receptacle space 5. FIG. 6 shows a sectional view of the battery module 6 and of the lid 11 from FIG. 4.

Overall, the battery modules 6 in the accumulator assembly 1 can be individually replaced, and on account thereof the accumulator assembly 1 according to the invention can be serviced with reduced complexity. In the case of advantageous further design embodiments of the accumulator assembly, the respective battery module can be fixed to the housing upper part by way of a movement in the direction of the latter. This can significantly simplify the assembly operation as well as the maintenance of the accumulator assembly.

What is claimed is:

1. An accumulator assembly for an electric or hybrid vehicle, comprising:
   a housing including a housing upper part and a housing lower part releasably fixed to the housing upper part;
   the housing upper part fixable to a floor panel of the vehicle;
   at least one battery module disposed in a receptacle space between the housing upper part and the housing lower part, the at least one battery module releasably fixed to the housing upper part; and
   wherein the at least one battery module is coupled to the housing lower part such that the at least one battery module and the lower housing part are conjointly fixable to the housing upper part via a movement in a direction of the housing upper part.

2. The accumulator assembly according to claim 1, wherein at least one of:
   the housing upper part is configured to be tub-shaped and the housing lower part is configured to be one of tub-shaped and plate-shaped; and
   at least one of the housing upper part and the housing lower part is, at least in regions, composed of at least one of a metal and a fibre-reinforced plastics material.

3. The accumulator assembly according to claim 1, wherein at least one of the housing upper part and the housing lower part include an integrally configured reinforcement structure.

4. The accumulator assembly according to claim 1, wherein the housing upper part is fixed in one of a force-fitting manner, a form-fitting manner, and a material-bonded manner to at least one of the floor panel and at least one vehicle support of the vehicle.

5. The accumulator assembly according to claim 4, wherein the housing upper part is fixed in a material-bonded manner via an adhesive connection to at least one of the floor panel and the at least one vehicle support, and wherein the adhesive connection in relation to an outside is protected via a water-tight seal structure.

6. The accumulator assembly according to claim 1, wherein at least one of:
the housing upper part, at least in regions, forms the floor panel; and
the housing lower part forms an underride protection for the at least one battery module.

7. The accumulator assembly according to claim 1, wherein the at least one battery module is releasably fixed in a force-fitting manner to the housing upper part.

8. The accumulator assembly according to claim 7, wherein:
the at least one battery module includes a plurality of battery modules;
the housing lower part is defined by a plurality of lids, a respective lid assigned to a respective battery module such that a number of lids corresponds to a number of battery modules; and
the respective battery module is fixed in at least one of a form-fitting manner, a force-fitting manner, and a materially integral manner to the respective lid.

9. The accumulator assembly according to claim 7, wherein the at least one battery module is releasably fixed in a force-fitting manner to the housing upper part via a self-latching snap-fit connection.

10. The accumulator assembly according to claim 1, further comprising:
an electrical switching unit fixed to the housing upper part;
wherein a plurality of electrical terminals of the at least one battery module directed towards the housing upper part are configured to be electrically switched to the switching unit via a movement in a direction of the housing upper part.

11. The accumulator assembly according to claim 1, further comprising:
a cooling device including a coolant distribution with a plurality of infeeding pipes and a plurality of outfeeding pipes and including at least one cooling plate for the at least one battery module, the at least one cooling plate configured to be surrounded by a flow of a coolant; and
wherein the coolant distribution of the cooling device is fixed to the housing upper part, and the at least one cooling plate is fixed to the at least one battery module facing the housing lower part.

12. The accumulator assembly according to claim 1, wherein:
the at least one battery module includes a plurality of battery modules;
the housing lower part is defined by a plurality of lids, a respective lid assigned to a respective battery module such that a number of lids corresponds to a number of battery modules; and
the plurality of lids each include an encircling sealing groove and a seal disposed within the sealing groove.

13. The accumulator assembly according to claim 1, wherein:
the at least one battery module includes a plurality of battery modules; and
the housing lower part is defined by a plurality of lids that are independently securable to and releasable from the housing upper part, a respective lid assigned to a respective battery module such that a number of lids corresponds to a number of battery modules.

14. An electric or hybrid vehicle comprising an accumulator assembly and a floor panel, the accumulator assembly including:
a housing including a housing upper part and a housing lower part releasably fixed to the housing upper part;
the housing upper part fixable to the floor panel;
a plurality of battery modules disposed in a receptacle space between the housing upper part and the housing lower part, the plurality of battery modules releasably fixed to the housing upper part; and
wherein the housing lower part is defined by a plurality of lids, a respective lid assigned to a respective battery module such that a number of lids corresponds to a number of battery modules.

15. The electric or hybrid vehicle according to claim 14, wherein at least one of:
the housing upper part is fixed in one of a force-fitting manner and a form-fitting manner to one of the floor panel and at least one vehicle support; and
the housing upper part is fixed in a material-bonded manner to at least one of the floor panel and the at least one vehicle support.

16. The electric or hybrid vehicle according to claim 15, wherein the material-bonded manner is an adhesive connection.

17. The electric or hybrid vehicle according to claim 14, wherein the housing upper part, at least in regions, forms the floor panel.

18. The electric or hybrid vehicle according to claim 14, wherein the plurality of lids are securable to and releasable from the housing upper part independently of one another.

19. An accumulator assembly for an electric or hybrid vehicle, comprising:
a housing including a housing upper part and a housing lower part releasably fixed to the housing upper part, the housing upper part fixable to a floor panel of the vehicle;
an electrical switching unit;
a plurality of battery modules disposed in a receptacle space between the housing upper part and the housing lower part, the at least one battery module releasably fixed to the housing upper part;
a plurality of lids defining the housing lower part, a respective lid of the plurality of lids assigned and coupled to a respective battery module of the plurality of battery modules in at least one of a form-fitting manner, a force-fitting manner, and a materially integral manner; and
wherein a number of the plurality of lids corresponds to a number of the plurality of battery modules.

20. The accumulator assembly according to claim 19, further comprising:
a cooling device including a coolant distribution with a plurality of infeeding pipes and a plurality of outfeeding pipes, the cooling device further including a plurality of cooling plates structured and arranged to be surrounded by a flow of a coolant;
wherein the coolant distribution is fixed to the housing upper part; and wherein the plurality of cooling plates are respectively coupled to the plurality of battery modules facing the housing lower part.

\* \* \* \* \*